US009146625B2

(12) United States Patent
Myung et al.

(10) Patent No.: US 9,146,625 B2
(45) Date of Patent: Sep. 29, 2015

(54) APPARATUS AND METHOD TO DETECT COORDINATES IN A PENBASED DISPLAY DEVICE

(71) Applicant: Samsung Electronics Co. Ltd., Suwon-si, Gyeonggi-do (KR)

(72) Inventors: Seho Myung, Seoul (KR); Sung-Hee Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 13/856,661

(22) Filed: Apr. 4, 2013

(65) Prior Publication Data

US 2013/0265287 A1   Oct. 10, 2013

(30) Foreign Application Priority Data

Apr. 4, 2012   (KR) .................. 10-2012-0034866

(51) Int. Cl.
*G06F 3/033* (2013.01)
*G06F 3/0354* (2013.01)
*G06F 3/03* (2006.01)
*G09G 3/00* (2006.01)

(52) U.S. Cl.
CPC ............ *G06F 3/0354* (2013.01); *G06F 3/0317* (2013.01); *G06F 3/03542* (2013.01); *G06F 3/03545* (2013.01); *G09G 3/00* (2013.01)

(58) Field of Classification Search
CPC .......... G06F 3/03; G06F 3/033; G06F 3/0354
USPC .............. 345/156–184; 235/472.03; 715/702; 400/76
See application file for complete search history.

(56) References Cited

U.S. PATENT DOCUMENTS

| 5,661,506 | A * | 8/1997 | Lazzouni et al. ............. 345/179 |
| 6,377,249 | B1 * | 4/2002 | Mumford ..................... 345/179 |
| 2002/0046887 | A1 * | 4/2002 | Yanagisawa et al. ...... 178/18.01 |
| 2003/0034961 | A1 * | 2/2003 | Kao ............................. 345/179 |
| 2003/0206168 | A1 * | 11/2003 | Kejser et al. ................. 345/441 |
| 2003/0215139 | A1 * | 11/2003 | Shilman et al. .............. 382/186 |
| 2005/0053405 | A1 * | 3/2005 | Brouhon et al. ............... 400/76 |
| 2006/0078202 | A1 * | 4/2006 | Shilman et al. .............. 382/186 |
| 2006/0193522 | A1 * | 8/2006 | Sonoda et al. ............... 382/232 |
| 2007/0138283 | A1 * | 6/2007 | Dymetman et al. .......... 235/454 |
| 2007/0152986 | A1 * | 7/2007 | Ogawa ......................... 345/179 |
| 2008/0025612 | A1 * | 1/2008 | Wang et al. .................. 382/188 |
| 2008/0231608 | A1 * | 9/2008 | Nagata ......................... 345/173 |
| 2008/0253608 | A1 * | 10/2008 | Long et al. ................... 382/100 |
| 2009/0066649 | A1 * | 3/2009 | Kang et al. ................... 345/166 |
| 2009/0146967 | A1 * | 6/2009 | Ino et al. ....................... 345/173 |

(Continued)

*Primary Examiner* — Prabodh M Dharia
(74) *Attorney, Agent, or Firm* — Jefferson IP Law, LLP

(57) ABSTRACT

An apparatus and method to detect coordinates in a pen-based display device are provided. In the apparatus, when an electronic pen is placed at a specific position on a display, an image of a pixel group corresponding to the specific position is captured through a camera provided in the electronic pen, a reference point is detected in the pixel group by processing the captured image of the pixel group, an area type of the captured image is determined based on the reference point, values of a coordinate indications corresponding to the position of the pixel group are determined, selectively correcting the determined values of the coordinate indications according to the determined area type to determine final values of the coordinate indications, and applying a predetermined coordinates calculation rule to the determined final values of the coordinate indications to determine final coordinates of the electronic pen.

32 Claims, 12 Drawing Sheets

(56) References Cited

U.S. PATENT DOCUMENTS

| | | | |
|---|---|---|---|
| 2009/0292989 A1* | 11/2009 | Matthews et al. | 715/702 |
| 2010/0156853 A1* | 6/2010 | Narusawa | 345/183 |
| 2010/0328272 A1* | 12/2010 | Craven-Bartle et al. | 345/179 |
| 2011/0310066 A1* | 12/2011 | Fermgard et al. | 345/179 |
| 2012/0006898 A1* | 1/2012 | Rezende | 235/472.03 |
| 2012/0092277 A1* | 4/2012 | Momchilov | 345/173 |
| 2013/0147749 A1* | 6/2013 | Matthews et al. | 345/173 |
| 2013/0265255 A1* | 10/2013 | Myung et al. | 345/173 |

\* cited by examiner

APPARATUS AND METHOD TO DETECT COORDINATES IN A PENBASED DISPLAY DEVICE

PRIORITY

This application claims the benefit under 35 U.S.C. §119 (a) of a Korean patent application filed on Apr. 4, 2012 in the Korean Intellectual Property Office and assigned Serial No. 10-2012-0034866, the entire disclosure of which is hereby incorporated by reference.

BACKGROUND OF THE INVENTION

1. Field of the Invention

The present invention relates to an electronic device having a display device. More particularly, the present invention relates to a method and apparatus to detect coordinates in an electronic device having a pen-based display device.

2. Description of the Related Art

Typically, electronic devices such as a TeleVision (TV), a portable phone, a computer, an electronic blackboard, a tablet, an e-book reader, and a smart phone adopt a keyboard, a keypad, a mouse, and so forth for interfacing with a user. However, with the recent development trend of small-size electronic devices with enhanced portability, User Interface (UI) methods have evolved accordingly. Major UI methods include a touch screen input scheme in which a user applies an input by directly touching a screen with a finger or a touch pen and a motion recognition scheme in which a user applies an input by a gesture.

The touch screen input scheme requires inputs such as a handwritten input on a display. For example, a resistive-type touch screen input scheme enables input through an input means like a stylus pen. However, as a capacitive-type touch screen input scheme has gained in popularity, handwriting is difficult to input.

In the touch screen input schemes, an input is determined by recognizing patterns predefined on a display using an electronic pen. Specifically, patterns formed on the display are recognized by means of the electronic pen having a camera, the position of the electronic pen is detected based on the recognized patterns, and an input is determined based on the detected position value. That is, an area of the display pointed by the electronic pen is captured along the direction of the pen point of the electronic pen through the camera and preset patterns are detected from the captured image. Thus, the position pointed by the electronic pen or a command is recognized based on the detected patterns.

FIG. 1 illustrates exemplary patterns formed on a display in an electronic pen-based input scheme according to the related art.

Referring to FIG. 1, pixels 101, sub-pixels 103, and Black Matrices (BMs) 105 are defined on a display. Each pixel 101 is divided into sub-pixels 103 representing Red (R), Green (G) and Blue (B), respectively. Adjacent sub-pixels and adjacent pixels are separated from each other by BMs 105.

According to the electronic pen-based input scheme illustrated in FIG. 1, changed sub-pixels 107 are obtained by applying preset patterns to pixels or sub-pixels. A position or motion on the display may be determined by recognizing changed sub-pixels 107 using an electronic pen. However, the changed sub-pixels 107 cause performance degradation of the display. That is, the changed sub-pixels 107 may distort represented colors or affect brightness or sharpness of the display in relation to the performance of the display. Moreover, when the electronic pen recognizes a wrong pattern, it is not easy to detect or correct the error.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method to recognize a position and a pattern using an electronic pen in an electronic device having a touch input-type display device.

Another aspect of the present invention is to provide an apparatus and method to recognize a position and a pattern using an electronic pen without almost any degradation of brightness or contrast of a display in an electronic device having a touch input-type display device.

In accordance with an aspect of the present invention, a method of detecting coordinates of a position of an electronic pen on a display based on a plurality of pixel groups arranged on the display is provided. The method includes capturing an image of a pixel group corresponding to a specific position through a camera provided in the electronic pen, when the electronic pen is placed at a specific position on the display, detecting a reference point in the pixel group by processing the captured image of the pixel group and determining an area type of the captured image based on the reference point, determining values of coordinate indications corresponding to the position of the pixel group, selectively correcting the determined values of the coordinate indications according to the determined area type to determine final values of the coordinate indications, and applying a predetermined coordinates calculation rule to the determined final values of the coordinate indications to determine final coordinates of the electronic pen.

In accordance with another aspect of the present invention, a method of detecting coordinates of a position of an electronic pen on a display based on a plurality of pixel groups arranged on the display is provided. The method includes, when the electronic pen is placed at a specific position on the display, receiving an image of a pixel group corresponding to a specific position that is captured through a camera provided in the electronic pen, detecting a reference point in the pixel group by processing the received image of the pixel group, determining an area type of the captured image based on the reference point, determining values of coordinate indications corresponding to the position of the pixel group, selectively correcting the determined values of the coordinate indications according to the determined area type and determining final values of the coordinate indications, and applying a predetermined coordinates calculation rule to the determined final values of the coordinate indications and determining final coordinates of the electronic pen.

In accordance with another aspect of the present invention, an apparatus to detect coordinates of a position on a display based on a plurality of pixel groups arranged on the display is provided. The apparatus includes, a camera unit configured to capture an image of a pixel group corresponding to the specific position, when an electronic pen is placed at the specific position on the display, a recognizer configured to detect a reference point in the pixel group by processing the captured image of the pixel group, determine an area type of the captured image based on the reference point, and determine values of coordinate indications corresponding to the position of the pixel group, a coordinate indication decider configured to determine final values of the coordinate indications by selectively correcting the determined values of the coordinate indications according to the determined area type, and a coordinate decider configured to determine final coordinates of the electronic pen by applying a predetermined coordinates calculation rule to the determined final values of the coordinate indications.

In accordance with another aspect of the present invention, an apparatus to detect coordinates of a position on a display based on pixel groups arranged on the display is provided. The apparatus includes, a recognizer configured to detect a reference point in a pixel group corresponding to the specific position by processing an image of the pixel group captured through a camera provided in the electronic pen, when the electronic pen is placed at the specific position on the display, determine an area type of the captured image based on the reference point, and determine values of coordinate indications corresponding to the position of the pixel group, a coordinate indication decider is configured determine final values of the coordinate indications by selectively correcting the determined values of the coordinate indications according to the determined area type, and a coordinate decider is configured determine final coordinates of the electronic pen by applying a predetermined coordinates calculation rule to the determined final values of the coordinate indications.

In accordance with another aspect of the present invention, a display panel to display content received from an electronic pen is provided. On the display panel, pixel groups are arranged, each pixel group being a minimum recognition unit of the electronic pen and including first to fourth pixels, a pattern representing a reference point is formed on a first sub-pixel among sub-pixels of the first pixel, patterns representing coordinate indications $x_0$ and $y_0$ are formed on the other sub-pixels of the first pixel, patterns representing coordinate indications $x_3$, $x_2$ and $x_1$ are formed on sub-pixels of the second pixel located at the same Y coordinate as the first pixel, patterns representing coordinate indications $y_3$, $y_2$ and $y_1$ are formed on sub-pixels of the third pixel located at the same X coordinate as the reference point, and patterns representing parity indications are formed on sub-pixels of the fourth pixel located in a diagonal direction from the first pixel.

In accordance with a further aspect of the present invention, a method of fabricating a display panel to display content received from an electronic pen is provided. In the method, pixel groups are arranged, each pixel group being a minimum recognition unit of the electronic pen and including first to fourth pixels, a pattern representing a reference point is formed on a first sub-pixel among sub-pixels of the first pixel, patterns representing coordinate indications $x_0$ and $y_0$ are formed on the other sub-pixels of the first pixel, patterns representing coordinate indications $x_3$, $x_2$ and $x_1$ are formed on sub-pixels of the second pixel located at the same Y coordinate as the first pixel, patterns representing coordinate indications $y_3$, $y_2$ and $y_1$ are formed on sub-pixels of the third pixel that are located at the same X coordinate as the reference point, and patterns representing parity indications are formed on sub-pixels of the fourth pixel that are located in a diagonal direction from the first pixel.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention provides an input method for an electronic pen which may be used for an electronic device having a display screen, such as a portable phone, a computer, an electronic blackboard, a tablet, or an e-book reader. Particularly, the present invention provides an electronic pen-based input method in which specific patterns formed on sub-pixels are recognized using an electronic pen. The position of the electronic pen is determined based on the recognized patterns and an input is applied at the determined position on a display such as a Liquid Crystal Display (LCD) display, a Plasma Display Panel (PDP) display, an Organic Light Emitting Diode (OLED) display, an Active Matrix OLED (AMOLED) display, or an electronic paper display.

Accordingly, the present invention provides an electronic pen which detects patterns formed in parts of sub-pixels and determines an input position and gesture information, and a display including sub-pixels formed into predetermined patterns.

The present invention is applicable irrespective of the type of a display used. The display may be configured as an LCD display, a PDP display, an OLED, an AMOLED display, or an electronic paper display.

Figure 1:
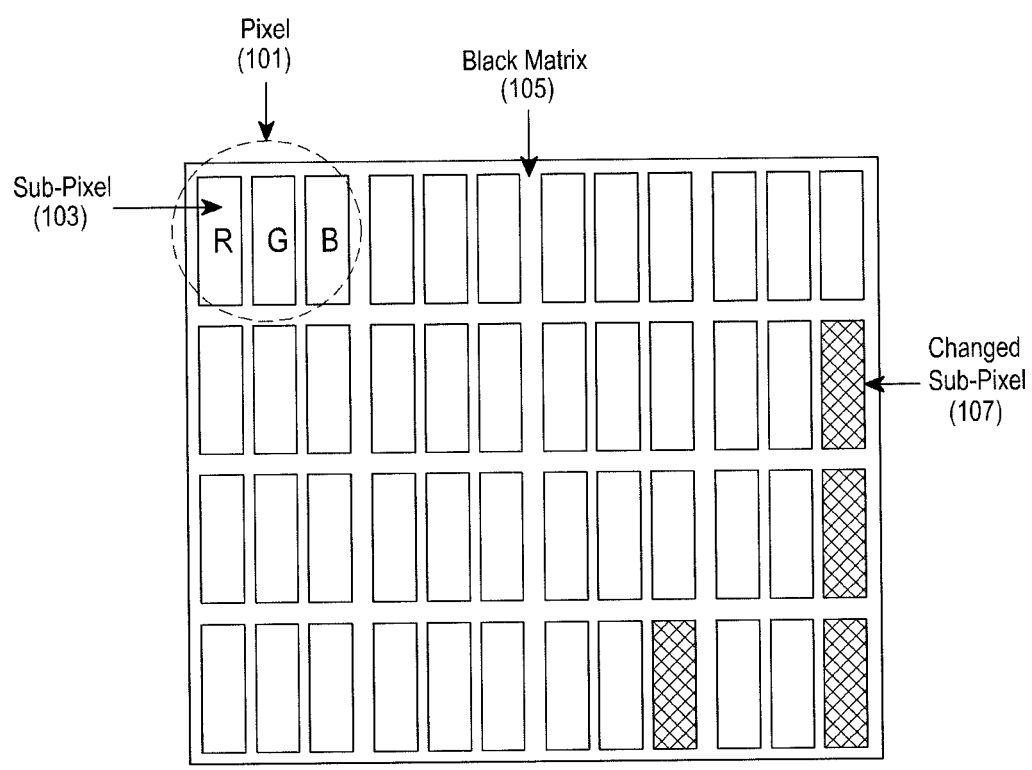
FIG. 1 illustrates exemplary patterns formed on a display in an electronic pen-based input scheme according to the related art.
Figure 2A:
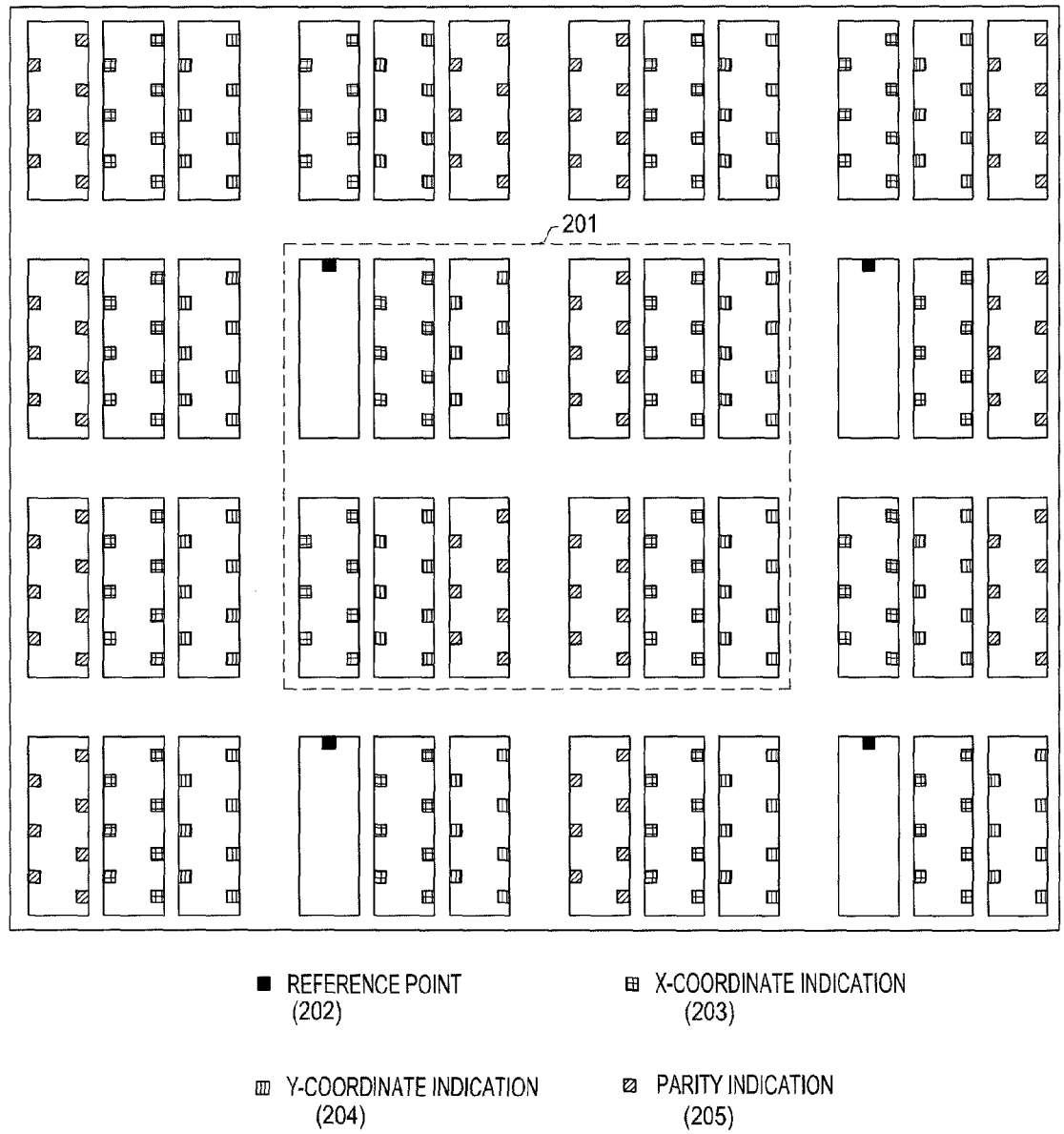
FIGS. 2A and 2B illustrate exemplary methods of forming patterns on a display to implement an electronic pen-based input scheme according to an exemplary embodiment of the present invention.
Figure 2B:
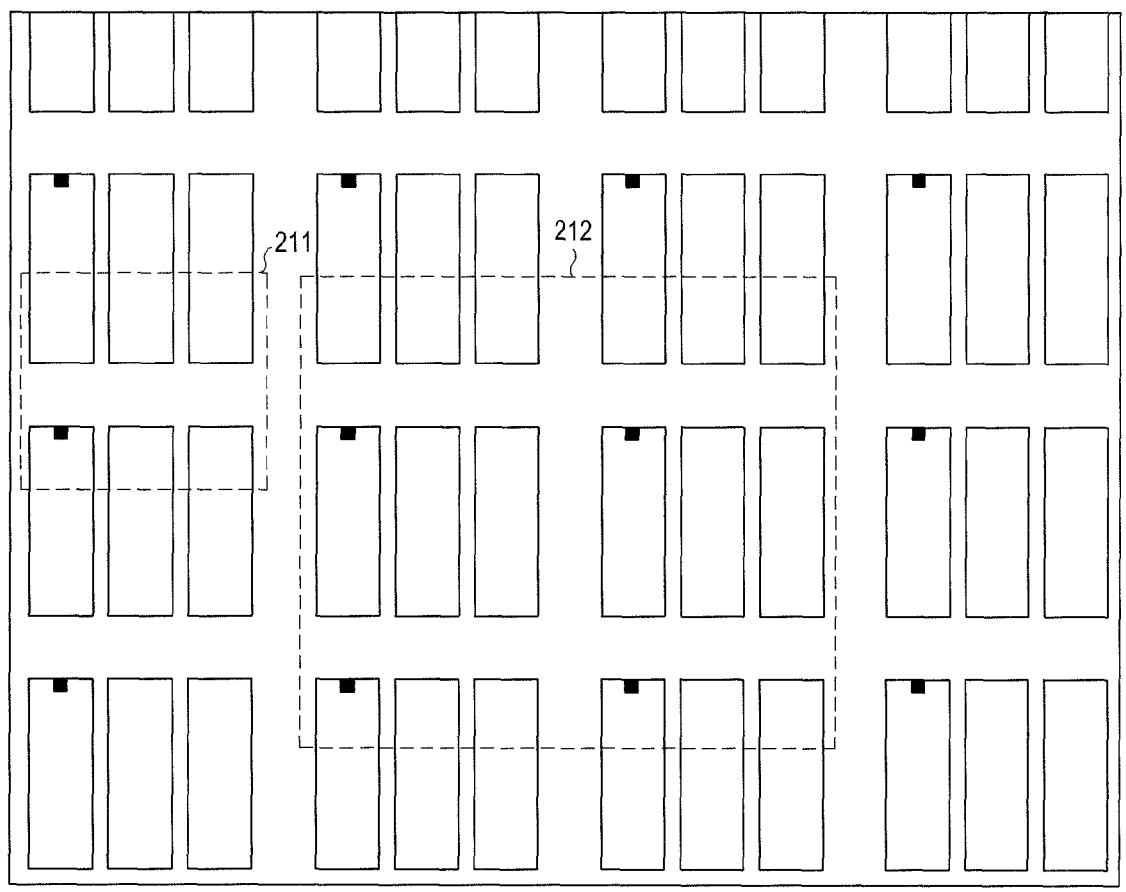

FIGS. 2A and 2B illustrate exemplary methods of forming patterns on a display to implement an electronic pen-based input scheme according to an exemplary embodiment of the present invention.

In particular, FIG. 2A illustrates an example in which patterns are formed on pixels in a display.

Referring to FIG. 2A, four pixels are set as a minimum unit to be optically recognized by an electronic pen, as indicated by reference numeral 201. Predetermined patterns are regularly formed on each pixel. For example, since the same pattern representing a reference point 202 is formed at a fixed position in every four pixels 201, the electronic pen may detect the reference point 202 to determine a reference at which to start a coordinate recognition operation. While the minimum unit to be optically recognized by the electronic pen is set to 4 pixels, the minimum unit is not limited to any specific value.

After detecting the reference point 202, the electronic pen recognizes X-coordinate indications 203 and Y-coordinate indications 204 to determine its position. Each X-coordinate indication 203 is positioned at one of 7 positions defined in a sub-pixel and each Y-coordinate indication 204 is positioned at one of 7 positions defined in a sub-pixel.

FIG. 2B illustrates another exemplary embodiment of a minimum unit that an electronic pen optically recognizes according to an exemplary embodiment of the present invention.

Referring to FIG. 2B, reference numeral 211 denotes one pixel. If the minimum unit to be optically recognized by the electronic pen is set to four pixels, reference numeral 212 denotes the minimum unit. In this manner, pixels and sub-pixels may be configured differently depending on the characteristics of a display and the recognition minimum unit of the electronic pen and the coordinate indications may be configured according to the pixel configuration of the display.

Figure 3A:
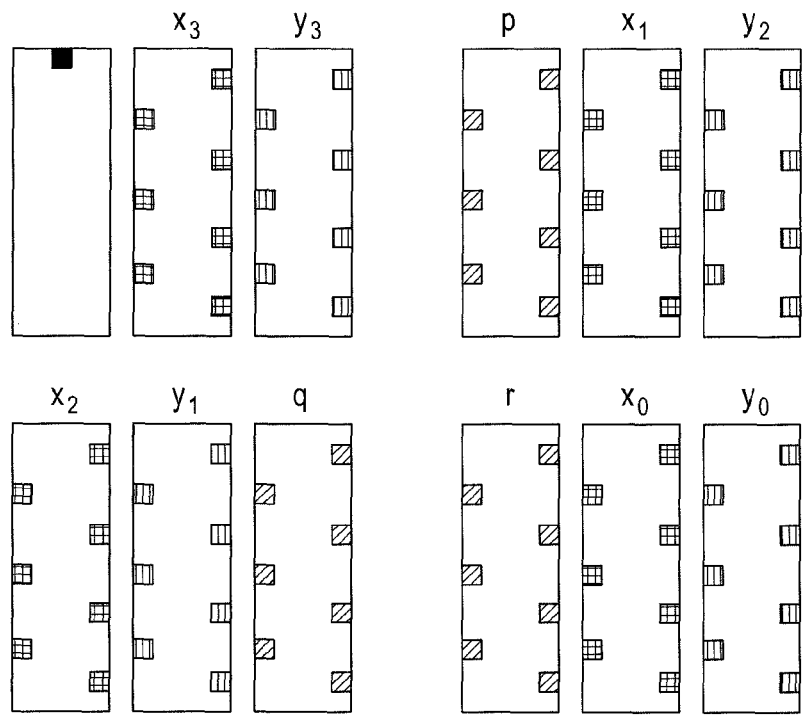
FIGS. 3A and 3B illustrate mapping relationships between sub-pixels and coordinate indications on a display according to an exemplary embodiment of the present invention.
Figure 3B:
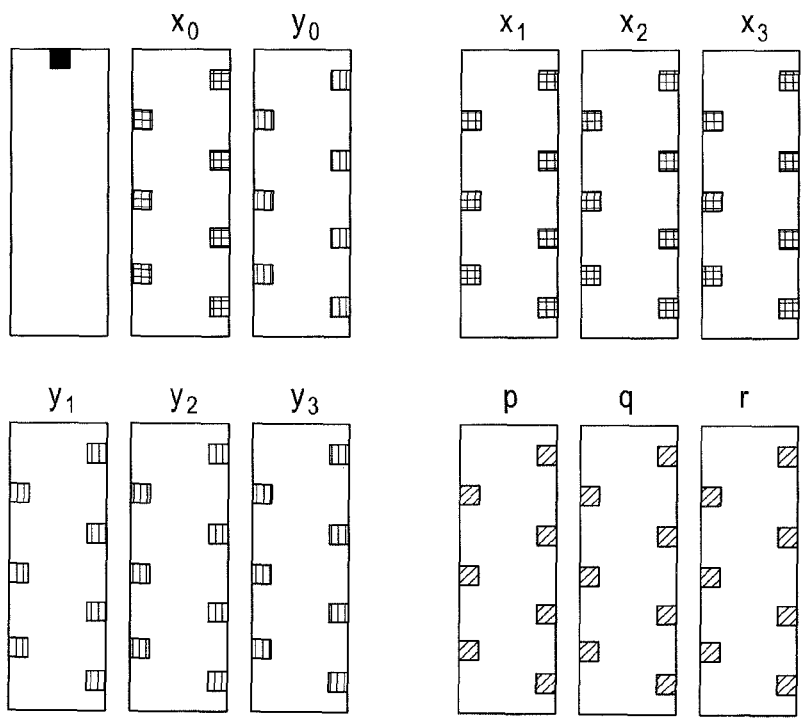

FIGS. 3A and 3B illustrate mapping relationships between sub-pixels and coordinate indications on a display according to an exemplary embodiment of the present invention. In particular, FIGS. 3A and 3B illustrate exemplary mapping relationships between indications and sub-pixels, if X-coordinate indications 203 and Y-coordinate indications 204 illustrated in FIGS. 2A and 2B are denoted respectively $x_3$, $x_2$, $x_1$, $x_0$, $y_3$, $y_2$, $y_1$ and $y_0$.

It is readily understood that there may exist many indication-sub-pixel mapping relationships other than those illustrated in FIGS. 3A and 3B.

A position of the display pointed at by the electronic pen is determined by recognizing the values of X-coordinate indications 203 and Y-coordinate indications 204 corresponding to sub-pixels and applying a predetermined rule to the recognized values. For example, if each of the coordinate indications x3, x2, $x_3$, $x_2$, $x_1$, $x_0$, $y_3$, $y_2$ and $y_1$ has an integer value ranging from 0 to 6 and the coordinate indication $y_0$ has an integer value ranging from 0 to 3, an X coordinate may be calculated by mathematical Equation (1) and a Y coordinate may be calculated by mathematical Equation (2).

$$7^3 \times x_3 + 7^2 \times x_2 + 7)x_1 + x_0 \qquad \text{Equation (1)}$$

$$7^3 \times 4xy_3 + 7)aty_2 + 4)y_1 + y_0 \qquad \text{Equation (2)}$$

According to mathematical Equation (1), the X coordinate may indicate one of a total of 2401 positions, ranging from 0 to 2400 and the Y coordinate may indicate one of a total of 1600 positions, ranging from 0 to 1599, according to the values of the coordinate indications $x_3$, $x_2$, $x_1$, $x_0$, $y_3$, $y_2$, $y_1$ and $y_0$. If the optical recognition minimum unit of the electronic pen is 2×2 pixels as described above, a position on a display having 4802(=2401×2) pixels along an X-axis direction and 3200(=1600×2) pixels along a Y-axis direction may be represented using the method illustrated in FIGS. 2A, 2B, 3A, and 3B and mathematical Equations (1) and (2).

If the optical recognition minimum unit of the electronic pen is A×B pixels, the method illustrated in FIGS. 2A, 2B, 3A, and 3B, and mathematical Equations (1) and (2) are available to any display having 2401xA pixels along the X-axis direction and 1600xB pixels along the Y-axis direction, for position representation.

While 7 positions are defined in each sub-pixel to represent an X-coordinate indication 203 and a Y-coordinate indication 204 in FIG. 2A, the number of positions defined in a sub-pixel is not limited to any specific value. However, if more positions are available to an X-coordinate indication 203 and a Y-coordinate indication 204 in sub-pixels, the recognition performance of the electronic pen may be increased, but an apparatus to recognize a position and a pattern gets expensive.

A position on a display may be calculated in a different manner by modifying the mathematical equations for calculating the X and Y coordinates based on the values of X-coordinate indications 203 and Y-coordinate indications 204.

Figure 4A:
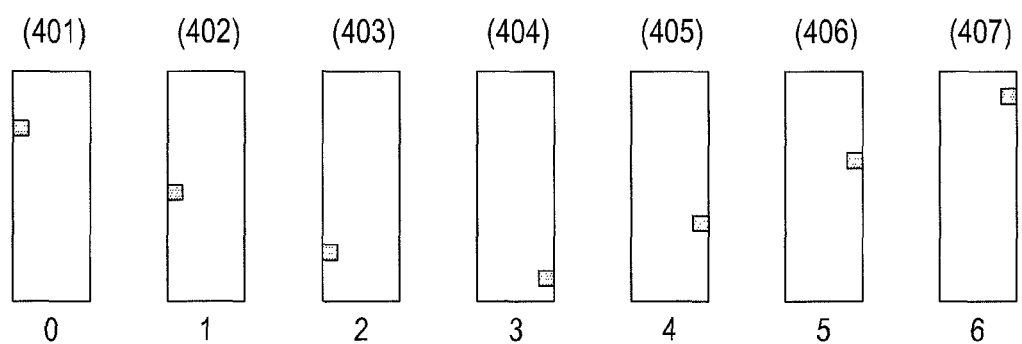
FIGS. 4A and 4B illustrate mapping relationships between patterns and coordinate indications on a display according to an exemplary embodiment of the present invention.

A method of defining coordinate values using the patterns of X-coordinate indications 203 and Y-coordinate indications 204 illustrated in FIGS. 2A and 2B is provided with reference to FIG. 4A. For the sake of brevity, it is assumed that each of the coordinate indications x3, x2, x1, x0, y3, y2 and y1 has an integer value ranging from 0 to 6 and the coordinate indication y0 has an integer value ranging from 0 to 3.

Figure 4B:
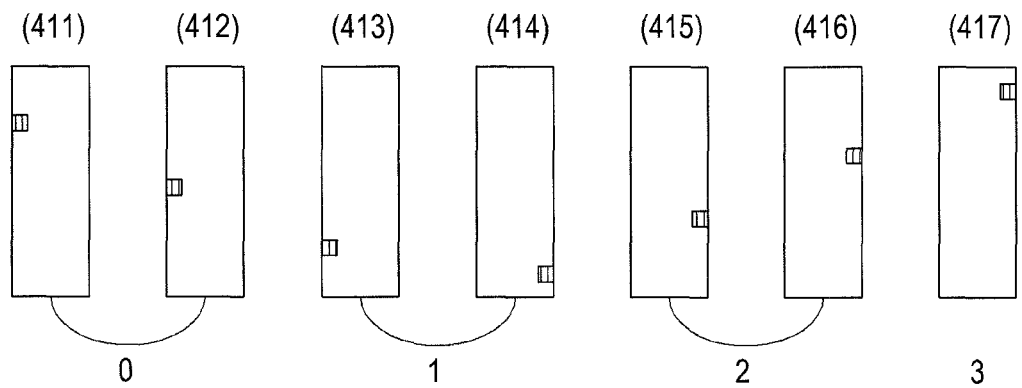

FIGS. 4A and 4B illustrate mapping relationships between patterns and coordinate indications on a display according to an exemplary embodiment of the present invention.

FIG. 4A illustrates an example of defining values for each of the coordinate indications $x_3$, $x_2$, $x_1$, $x_0$, $y_3$, $y_2$ and $y_1$ according to an exemplary embodiment of the present invention.

Referring to FIG. 4A, each indication pattern corresponds to one of numbers 0 to 6. For example, if a pattern 403 is formed on a sub-pixel, the pattern corresponds to number 2. Accordingly, one of the coordinate indications $x_3$, $x_2$, $x_1$, $x_0$, $y_3$, $y_2$ and $y_1$ corresponding to the sub-pixel has a value of 2.

FIG. 4B illustrates an example of defining values for the coordinate indication $y_0$. Since the coordinate indication $y_0$ ranges from 0 to 3 and a total of 7 patterns are available to represent the coordinate indication $y_0$, patterns having the same value will exist. For example, although reference numerals 413 and 414 denote different patterns, the patterns 413 and 414 may be defined as the same value of 1. The method of determining X and Y coordinates illustrated in FIGS. 4A and 4B is exemplary and thus many other methods are applicable.

Figure 5:
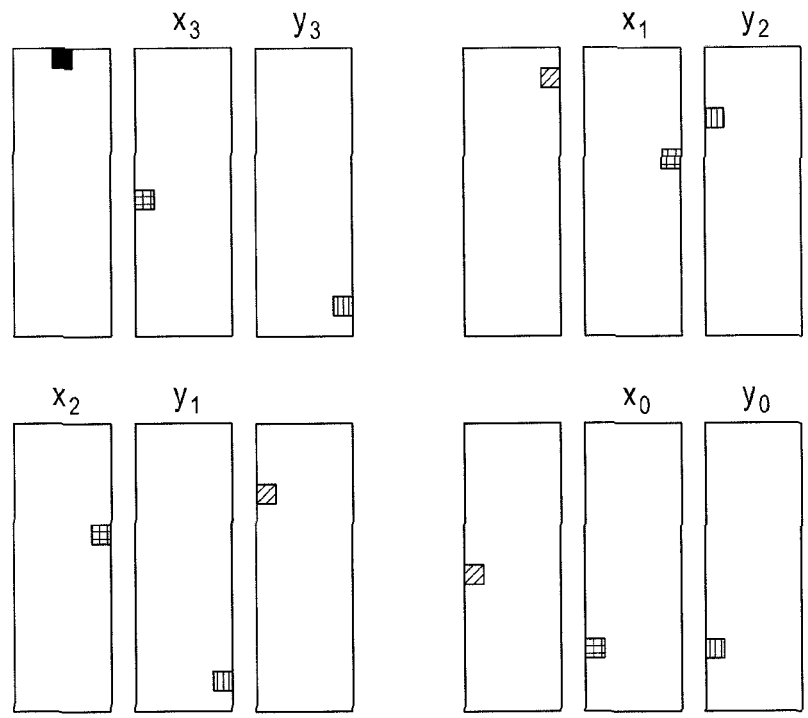
FIG. 5 illustrates exemplary patterns formed on a display according to an exemplary embodiment of the present invention.

FIG. 5 illustrates exemplary patterns formed on a display according to an exemplary embodiment of the present invention.

If the values of X-coordinate indications and Y-coordinate indications illustrated in FIG. 5 are calculated according to the patterns illustrated in FIGS. 4A and 4B, with coordinate indications having values of $x_3=1$, $x_2=5$, $x_1=5$, $x_0=2$, $y_3=3$, $y_2=0$, $y_1=3$, and $y_0=1$. Mathematical Equations (1) and (2) are calculated using these values. Then X and Y coordinates are obtained as follows.

$$7^3 \times 1 + 7^2 \times +) \text{ and} \qquad \text{Equation (3)}$$

$$7^2 \times 4 \times 3 + 7 \times + 70 + 4 \times + 41 = 601 \qquad \text{Equation (4)}$$

Figure 6:
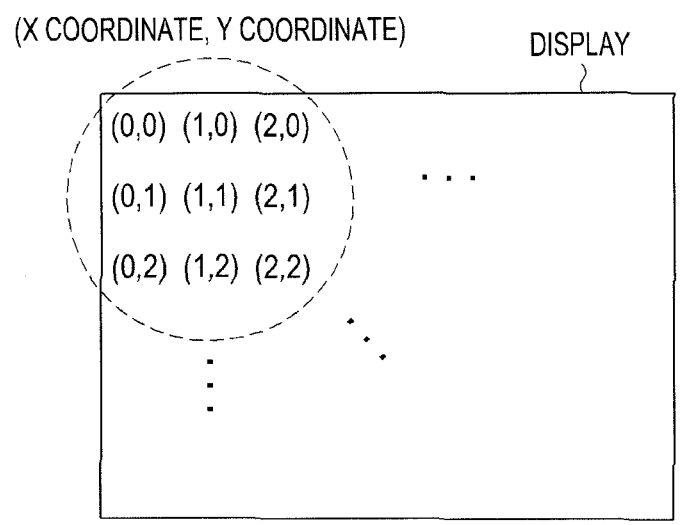
FIG. 6 illustrates a relationship between coordinates and a display according to an exemplary embodiment of the present invention.

In general, X and Y coordinates are sequentially defined on a display with respect to an upper left corner as the origin, as illustrated in FIG. 6. It is also possible to define the X and Y coordinates in a different manner to ensure security or for other purposes. A method to set X and Y coordinates is not required to implement the present invention and a detailed description of the same is not provided herein. For the sake of brevity, the present invention will be described using the sequential coordinates setting as illustrated in FIG. 6.

FIG. 6 illustrates a relationship between coordinates and a display according to an exemplary embodiment of the present invention.

Unless specifically mentioned otherwise, each X-Y coordinate pair illustrated in FIG. 6 represents the position of four pixels because the minimum unit used to recognize patterns by the electronic pen is assumed to be 4 pixels.

The operation of recognizing a position by the electronic pen described above with reference to FIGS. 2A to 5 is summarized as follows.

Position Recognition Operation of the Electronic Pen
(1) Pixels of a display are captured;
(2) A reference point is detected;
(3) X-coordinate indications and Y-coordinate indications are recognized with respect to the reference point and the values of the X-coordinate indications and the Y-coordinate indications are determined; and
(4) Final X-Y coordinates are calculated by applying a predetermined rule to the values of the X-coordinate indications and the Y-coordinate indications.

Figure 7:
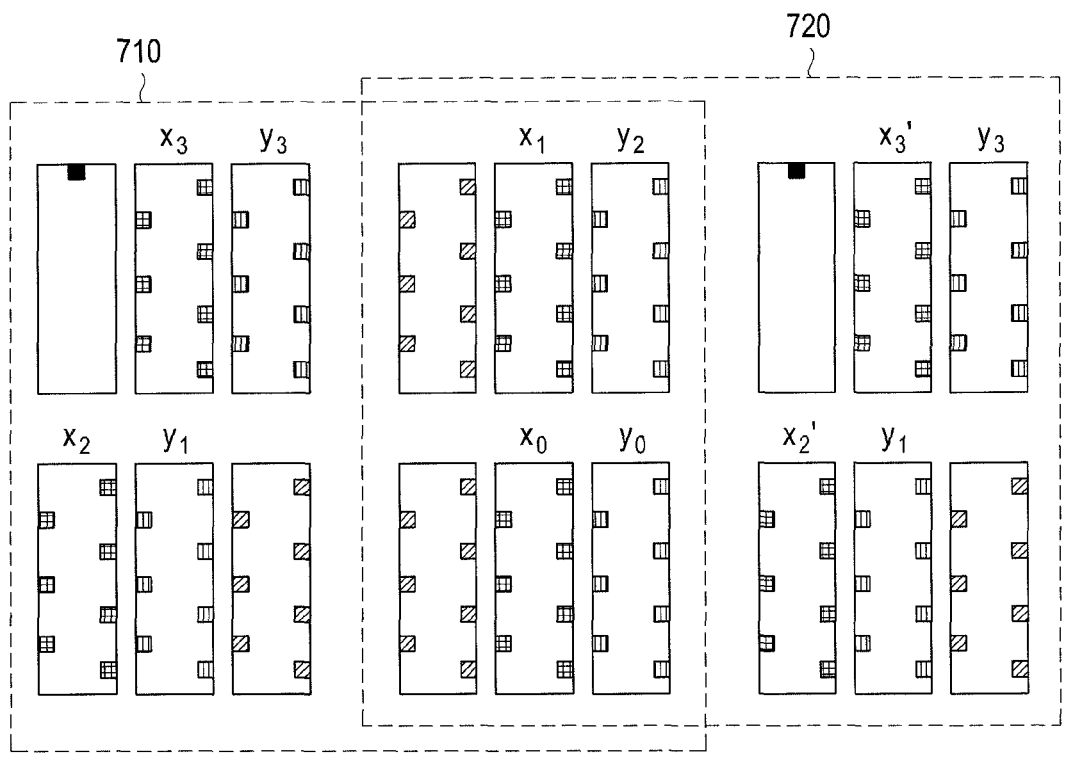
FIG. 7 illustrates an area that an electronic pen can recognize according to an exemplary embodiment of the present invention.

FIG. 7 illustrates an area that an electronic pen can recognize according to an exemplary embodiment of the present invention. It is assumed that coordinates are defined according to mathematical Equation (1) in FIG. 7.

Initially, the electronic pen initially recognizes pixels in an area 720 in FIG. 7. However, coordinate indications $x_3$, $x_2$, $x_1$, $x_0$, $y_3$, $y_2$, $y_1$ and $y_0$ are set for the X and Y coordinates of the area 710 and are denoted by (A, B). Thus, the area 720 includes a part of the area 710 having the coordinates (A, B) and a part of an area having coordinates (A+1, B). That is, if the electronic pen initially recognizes the pixels of the area 720, x1 and x0 are a part of X-coordinate indications representing the coordinate A which are recognized by the electronic pen with respect to a reference point, and x3' and x2' are a part of X-coordinate indications representing the coordinate (A+1). For example, if A=1126, A+1=1127. Therefore, the X-coordinate indications may be expressed as ($x_3$, $x_2$, $x_1$, $x_0$)=(3,1,6,6) and ($x_3'$, $x_2'$, $x_1'$, $x_0'$)=(3,2,0,0). However, if the electronic pen recognizes the area 720, the electronic pen recognizes ($x_3'$,$x_2'$,$x_1$,$x_0$) as X-coordinate indications and thus determines the values of the X-coordinate indications as ($x_3'$,$x_2'$,$x_1$,$x_0$)=(3,2,6,6)=1175. This value is far from the coordinate A or (A+1), resulting in a coordinates recognition error. To prevent generation of an error during coordinate recognition, it is necessary to correct a value recognized by the electronic pen to the coordinate A or (A+1).

Figure 8:
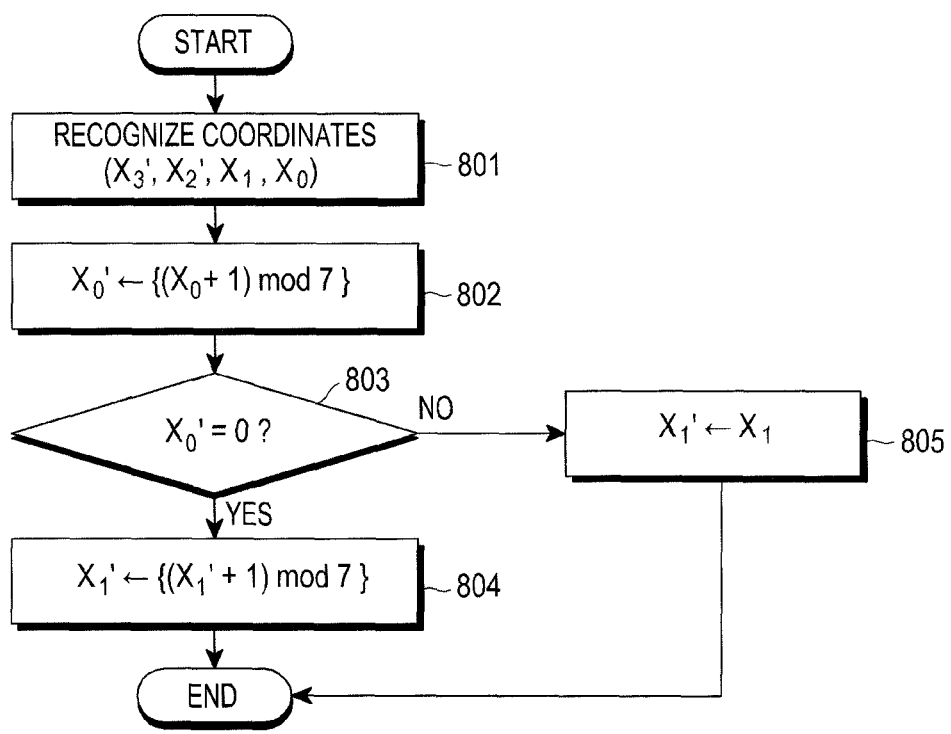
FIG. 8 is a flowchart illustrating a method of determining values of coordinate indications according to an exemplary embodiment of the present invention.

FIG. 8 is a flowchart illustrating a method of determining values of coordinate indications according to an exemplary embodiment of the present invention.

Referring to FIG. 8, a coordinate value ($x_3'$, $x_2'$, $x_1$, $x_0$) is recognized by the electronic pen in step 801. In step 802, $x_0'$ is calculated by adding 1 to x0 and then performing a modulo-7 operation on ($x_0$+1). It is determined whether $x_0'$ is 0 in step 803. If $x_0'$ is 0, this means that a carry has been generated. Therefore, $x_1'$ is calculated by adding 1 to $x_1$ and then performing a modulo-7 operation on ($x_1$+1) in step 804 and it is determined that $x_1'$=$x_1$ in step 805. In the same manner, the values of ($x_3'$, $x_2'$, $x_1'$, $x_0'$) are all calculated, thereby determining the value (A+1).

While only the case of an error generated during an X coordinate recognition operation has been described in FIGS. 7 and 8, the same problem may occur to a Y coordinate recognition operation. When an error is generated during the Y coordinate recognition operation, an erroneous Y coordinate may be corrected in the operation of FIG. 8.

Further disclosed is a method of minimizing the computation and implementation complexity in recognizing coordinates.

Figure 9:
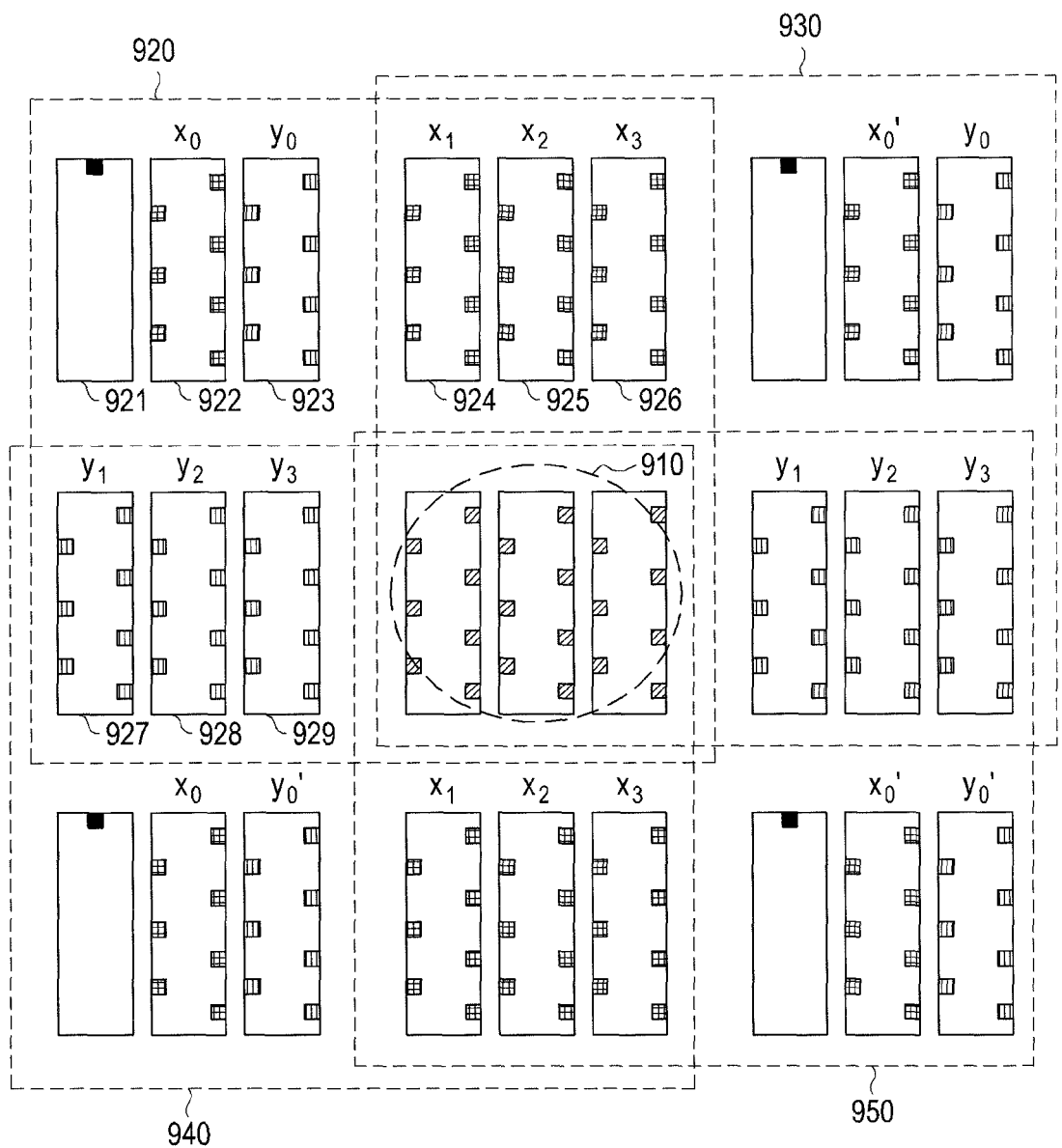
FIG. 9 illustrates an area that an electronic pen can recognize according to an exemplary embodiment of the present invention.

FIG. 9 illustrates an area that an electronic pen can recognize according to an exemplary embodiment of the present invention.

Referring to FIG. 9, $x_0$ and $y_0$ are allocated to sub-pixels 922 and 923 of a pixel having a reference point 921 in an area 920. Parity values are allocated only to sub-pixels located in a diagonal direction from a pixel having a reference point, as indicated by reference numeral 910. That is, the pixel 910 does not represent X and Y coordinates directly. Then $x_3$, $x_2$ and $x_1$ among X-coordinate indications corresponding to an X coordinate are allocated respectively to sub-pixels 924, 925 and 926 of a pixel without a reference point, and are located at the same Y coordinate as the reference point 921. Likewise, $y_3$, $y_2$ and $y_1$ among Y-coordinate indications corresponding to a Y coordinate are allocated respectively to sub-pixels 927, 928 and 929 of a pixel without a reference point, and are located at the same X coordinate as the reference point 921.

In the pattern allocation method illustrated in FIG. 9, if the electronic pen initially recognizes an area 930, the X-coordinate of the area 930 is determined by ($x_3$, $x_2$, $x_1$, $x_0'$), while the X-coordinate of the area 920 is determined by ($x_3$, $x_2$, $x_1$, $x_0$). The coordinate indications $x_0$ and $x_0'$ are placed in the relationship that $x_0=(x_0'-1) \bmod 7$. The areas 920 and 930 have the same Y coordinates ($y_3$, $y_2$, $y_1$, $y_0$)

If the electronic pen initially recognizes an area 940, the Y-coordinate of the area 940 is determined by ($y_3$, $y_2$, $y_1$, $y_0'$), while the Y-coordinate of the area 920 is determined by ($y_3$, $y_2$, $y_1$, $y_0$). The coordinate indications y0 and y0' are placed in the relationship that $y_0=(y_0'-1)\mod 7$. The areas 920 and 940 have the same X coordinates $(x_3, x_2, x_1, x_0)$.

If the electronic pen recognizes an area 950, the X coordinate and Y \ coordinate of the area 950 are determined by $(x_3, x_2, x_1, x_0')$ and $(y_3, y_2, y_1, y_0')$ respectively. The coordinate indications $x_0$ and $x_0'$ are placed in the relationship that $x_0=(x_0'-1)\mod 7$ and $y_0$ and $y_0'$ are placed in the relationship that $y_0=(y_0'-1)\mod 7$.

Therefore, if the electronic pen recognizes the area 920 on the display, the X and Y coordinates of the area 920 may be obtained from initially recognized X and Y coordinates without performing an additional computation operation to correct coordinates. If the electronic pen recognizes the area 930 or 940 on the display, the X and Y coordinates of the area 930 or 940 may be obtained by one simple computation operation. If the electronic pen recognizes the area 950 on the display, the X and Y coordinates of the area 950 may be obtained by two computation operations.

Compared to the example of FIG. 7, a carry does not occur during computation in the method of mapping sub-pixels to X-coordinate indications and Y-coordinate indications in FIG. 9. Since there is no need to determine whether a carry has occurred, computation is simplified.

Figure 10:
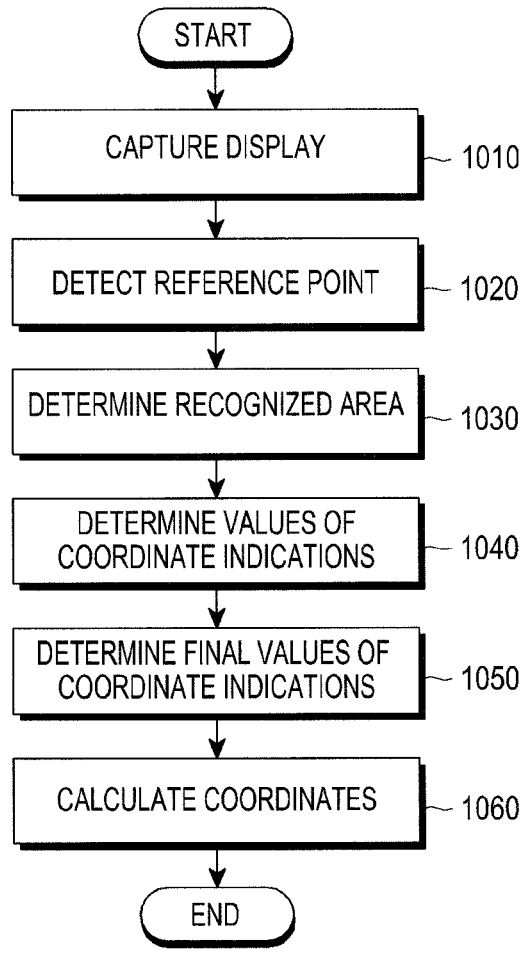
FIG. 10 is a flowchart illustrating a method of determining coordinates according to an exemplary embodiment of the present invention.

FIG. 10 is a flowchart illustrating a method of determining coordinates according to an exemplary embodiment of the present invention.

Referring to FIG. 10, a pixel image is captured from the surface of the display through a built-in camera of the electronic pen in step 1010. A reference point is detected by processing the captured pixel image in step 1020. The reference point may be detected by the electronic pen or an external electronic device other than the electronic pen.

In step 1030, an area recognized through the captured image is determined according to the position of the reference point. The electronic pen or an external electronic device other than the electronic pen may determine the recognized area.

According to the exemplary embodiment illustrated in FIG. 9, the recognized area may be determined as one of the four areas 920, 930, 940 and 950 according to the position of the reference point. Because the minimum recognition unit of the electronic pen is four pixels, four cases may be considered to determine an area recognized by the electronic pen. However, if the minimum recognition unit of the electronic pen is different, the number of possible cases to be considered to determine an area recognized by the electronic pen may be increased or decreased.

In step 1040, the values of X-coordinate indications and Y-coordinate indications in the determined area are determined by comparing the patterns of the X-coordinate indications and Y-coordinate indications with total images of predetermined patterns.

According to the exemplary embodiment illustrated in FIG. 9, the X-coordinate indications and Y-coordinate indications may be denoted by $x_3, x_2, x_1, x_0, x_0', y_3, y_2, y_1, y_0$ and $y_0'$. As illustrated in FIGS. 4A and 4B, the values of each of the coordinate indications $x_3, x_2, x_1, x_0, x_0', y_3, y_2$ and $y_1$, may range from 0 to 6 and each of the coordinate indications $y_0$ and $y_0'$ ranges from 0 to 3. These values may vary depending on the type of system. The electronic pen or an external electronic device other than the electronic pen may determine the values of the X-coordinate indications and the Y-coordinate indications.

In step 1050, the values of the coordinate indications $x_3, x_2, x_1, x_0, y_3, y_2, y_1$ and $y_0$ are determined according to the area determined in step 1030.

Step 1050 is described in more detail below with reference to FIG. 11.

Figure 11:
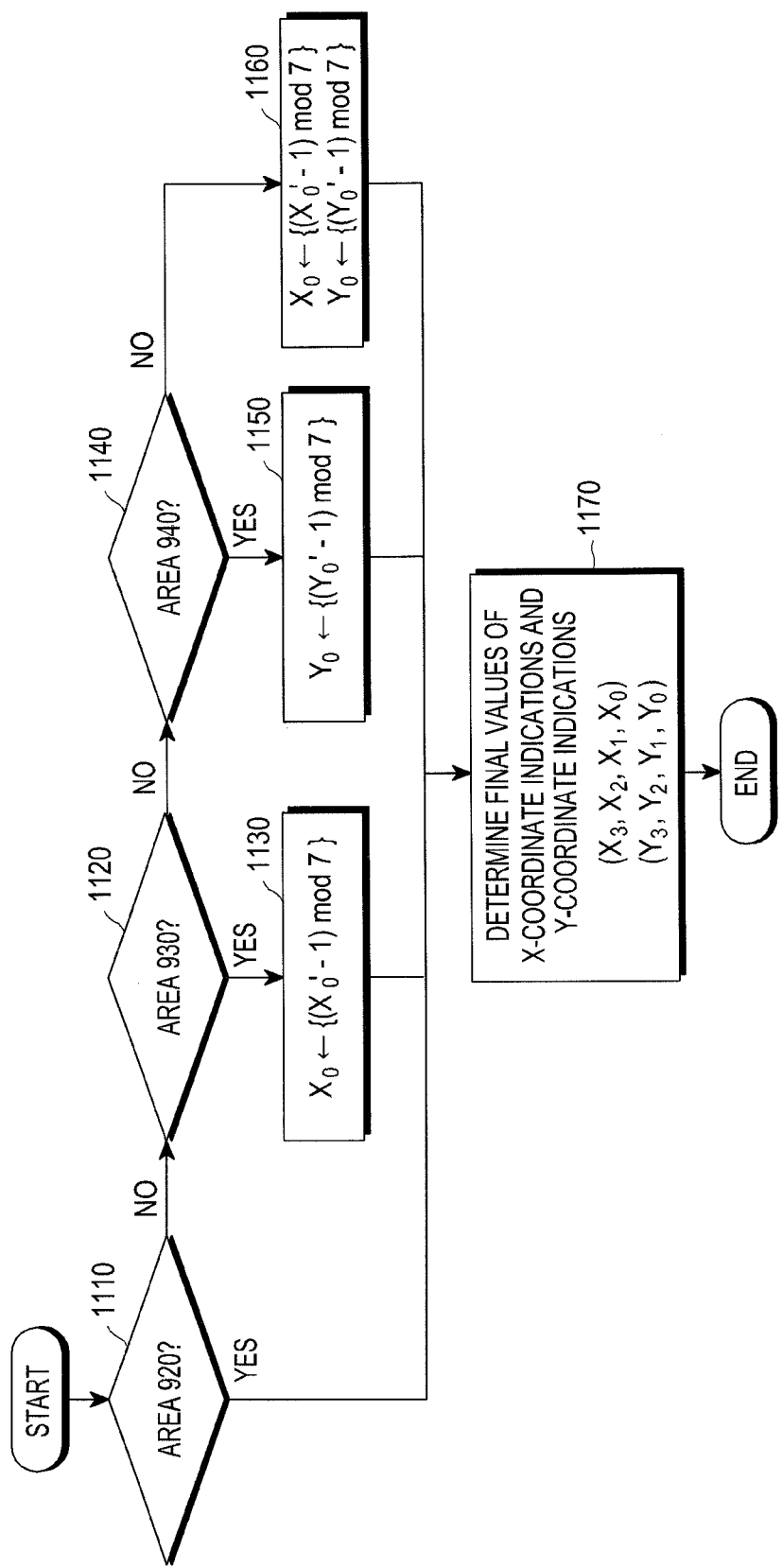
FIG. 11 is a flowchart illustrating a method of determining values of coordinate indications according to an exemplary embodiment of the present invention.

FIG. 11 is a flowchart illustrating a method of determining values of coordinate indications according to an exemplary embodiment of the present invention.

Referring to FIG. 11, when the area 920 is determined as recognized in step 1110, the values of the X-coordinate indications and Y-coordinate indications of the area 920 are determined based on the values determined in step 1040, in step 1170. If the area 930 is determined as recognized in step 1120, coordinate indication x0 is calculated by $x_0=(x_0'-1)\mod 7$ in step 1130 and the values of the X-coordinate indications and Y-coordinate indications of the area 930 are determined in step 1170. If the area 940 is determined as recognized in step 1140, coordinate indication $y_0$ is calculated by $y_0=(y_0'-1)\mod 7$ in step 1150 and the values of the X-coordinate indications and Y-coordinate indications of the area 940 are determined in step 1170. If the area 940 is not determined as recognized in step 1140, this indicates that the area 950 is determined as recognized. Thus $x_0$ and $y_0$ are calculated by $x_0=(x_0'-1)\mod 7$ and $y_0=(y_0'-1)\mod 7$ in step 1160 and the values of the X-coordinate indications and Y-coordinate indications of the area 950 are determined in step 1170.

While FIG. 11 illustrates an operation of determining the values of X-coordinate indications and Y-coordinate indications according to the exemplary embodiment of FIG. 9, this operation may be performed in various fashions according to a method of mapping X-coordinate indications and Y-coordinate indications to sub-pixels. The electronic pen or an external electronic device other than the electronic pen may determine the values of the X-coordinate indications and Y-coordinate indications.

Referring back to FIG. 10, in step 1060, the input position of the electronic pen is calculated using the values of the X-coordinate indications and Y-coordinate indications determined in step 1050 according to a predetermined rule. In the exemplary embodiment of the present invention, the input position of the electronic pen may be calculated by mathematical Equation (1). The mathematical Equation used to calculate the input position of the electronic pen may be defined as various rules based on the system which the present disclosure is implemented into. The electronic pen or an external electronic device other than the electronic pen may calculate the input position of the electronic pen.

An apparatus that performs the operations of FIGS. 10 and 11 is described below in more detail with reference to FIG. 12.

Figure 12:
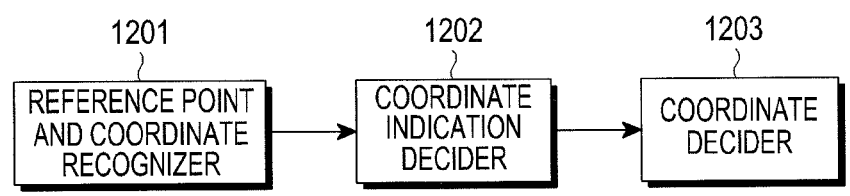
FIG. 12 is a block diagram of a coordinate determination apparatus according to an exemplary embodiment of the present invention.

FIG. 12 is a block diagram of a coordinate determination apparatus according to an exemplary embodiment of the present invention.

Referring to FIG. 12, a reference point and coordinate recognizer 1201 detects a reference point by processing a pixel image captured from the surface of the display through the camera in the electronic pen and determines a recognized area. The reference point and coordinate recognizer 1201 determines the values of X-coordinate indications and Y-coordinate indications in the recognized area by comparing the patterns of the coordinate indications with predetermined patterns.

If the area determined by the reference point and coordinate recognizer 1201 does not require correction of coordinate indication values, a coordinate indication decider 1202 provides the value of the X-coordinate indications and Y-coordinate indications determined by the reference point and coordinate recognizer 1201 to a coordinate decider 1203. If the area determined by the reference point and coordinate recognizer 1201 requires correction of coordinate indication values, the coordinate indication decider 1202 corrects a part of the determined values of the X-coordinate indications and Y-coordinate indications and provides the values of the X-coordinate indications and Y-coordinate indications to the coordinate decider 1203.

The coordinate decider 1203 finally determines the input position of the electronic pen by calculating coordinates according to a predetermined rule using the X-coordinate indications and Y-coordinate indications received from the coordinate indication decider 1202.

All or a part of the function units illustrated in FIG. 12 may be provided in the electronic pen or in an external electronic device other than the electronic pen.

As is apparent from the above description of the present disclosure, when a position and a pattern are recognized from a touch input-based display device by an electronic pen, the position and pattern can be recognized accurately with a minimum number of operations.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of detecting coordinates of a position of an electronic pen on a display based on a plurality of pixel groups arranged on the display, the method comprising:
capturing a pixel group corresponding to a specific position through a camera provided in the electronic pen, when the electronic pen is placed at the specific position on the display;
detecting a reference point in one pixel included in the pixel group and determining a position area of the pixel group according to the reference point;
determining values of coordinate indications corresponding to a plurality of pixels included in the pixel group in the area; and
applying a predetermined coordinates calculation rule to the values of the coordinate indications to determine final coordinates of the electronic pen,
wherein the coordinate indications have predetermined patterns defined as predetermined values, and each coordinate indication is located at one of the positions defined in a sub-pixel of each of the pixels of the pixel group except for the one pixel from which the reference point is detected.

2. The method of claim 1,
wherein the determination of the values of the coordinate indications comprises determining the predetermined values corresponding to the predetermined patterns of coordinate indications as the values of the coordinate indications.

3. The method of claim 2, wherein coordinate indications $x_0$ and $y_0$ are allocated to sub-pixels of a pixel corresponding to the reference point, coordinate indications $x_3$, $x_2$ and $x_1$ are allocated to sub-pixels of a pixel without the reference point that are located at the same X coordinate as the reference point, coordinate indications $y_3$, $y_2$ and $y_1$ are allocated to sub-pixels of a pixel without the reference point that are located at the same Y coordinate as the reference point, and parity indications are allocated to sub-pixels of a pixel located in a diagonal direction from the pixel having the reference point in the pixel group having the reference point.

4. The method of claim 3, wherein the area is one of a first area representing the pixel group having the reference point, a second area shifted from the first area by one pixel along an X-axis, a third area shifted from the first area by one pixel along a Y-axis, and a fourth area shifted from the first area by one pixel along the X-axis and by one pixel along the Y-axis.

5. The method of claim 4, wherein the determining of values of the coordinate indications comprises:
determining values of coordinate indications corresponding to the plurality of pixels included in the pixel group; and
selectively correcting the determined values of the coordinate indications according to the area to determine final values of the coordinate indications,
wherein the correcting of the determined values of the coordinate indications comprises:
determining the determined values of the coordinate indications as the final values of the coordinate indications, if the determined area is the first area,
correcting the value of a coordinate indication $x_0'$ among the determined values of the coordinate indications by a first equation and determining the values of the coordinate indications including the corrected value of the coordinate indication $x_0'$ as the final values of the coordinate indications, if the determined area is the second area,
correcting the value of a coordinate indication $y_0'$ among the determined values of the coordinate indications by a second equation and determining the values of the coordinate indications including the corrected value of the coordinate indication $y_0'$ as the final values of the coordinate indications, if the determined area is the third area, and
correcting the values of the coordinate indications $x_0'$ and $y_0'$ among the determined values of the coordinate indications by the first and second equations and determining the values of the coordinate indications including the corrected values of the coordinate indications $x0'$ and $y0'$ as the final values of the coordinate indications, if the determined area is the fourth area.

6. The method of claim 5, wherein the first equation is $x_0=(x_0'-1) \bmod 7$ and the second equation is $y_0=(y_0'-1) \bmod 7$.

7. The method of claim 6, wherein the predetermined coordinates calculation rule is defined as the following equations, $$X=7^3 \times x_3+7^2 \times x_2+7ox_1+x_0$$

$$Y=7^3 \times =oy_3+7ordy_2+4oy_1+y_0.$$

8. A method of detecting coordinates of a position of an electronic pen on a display based on a plurality of pixel groups arranged on the display, the method comprising:
when an electronic pen is placed at a specific position on a display:
receiving a pixel group corresponding to a specific position that is captured through a camera provided in the electronic pen,
detecting a reference point in one pixel included in the pixel group, and
determining a position area of the pixel group according to the reference point;
determining values of coordinate indications corresponding to a plurality of pixels included in the pixel group in the area; and
applying a predetermined coordinates calculation rule to the values of the coordinate indications and determining final coordinates of the electronic pen, wherein the coordinate indications have predetermined patterns defined as predetermined values, and each coordinate indication is located at one of the positions defined in a sub-pixel of each of the pixels of the pixel group except for the one pixel from which the reference point is detected.

9. The method of claim 8,
wherein the determination of the values of the coordinate indications comprises determining the predetermined values corresponding to the predetermined patterns of the coordinate indications as the values of the coordinate indications.

10. The method of claim 9, wherein coordinate indications $x_0$ and $y_0$ are allocated to sub-pixels of a pixel corresponding to the reference point, coordinate indications $x_3$, $x_2$ and $x_1$ are allocated to sub-pixels of a pixel without the reference point that are located at the same X coordinate as the reference point, coordinate indications $y_3$, $y_2$ and $y_1$ are allocated to sub-pixels of a pixel without the reference point that are located at the same Y coordinate as the reference point, and parity indications are allocated to sub-pixels of a pixel located in a diagonal direction from the pixel corresponding to the reference point in the pixel group having the reference point.

11. The method of claim 10, wherein the area is one of a first area representing the pixel group having the reference point, a second area shifted from the first area by one pixel along an X-axis, a third area shifted from the first area by one pixel along a Y-axis, and a fourth area shifted from the first area by one pixel along the X-axis and by one pixel along the Y-axis.

12. The method of claim 11, wherein the determining of values of the coordinate indications comprises:
determining values of coordinate indications corresponding to the plurality of pixels included in the pixel group; and
selectively correcting the determined values of the coordinate indications according to the area to determine final values of the coordinate indications,
wherein the correcting of the determined values of the coordinate indications comprises:
determining the determined values of the coordinate indications as the final values of the coordinate indications, if the determined area is the first area,
correcting the value of a coordinate indication $x_0'$ among the determined values of the coordinate indications by a first equation and determining the values of the coordinate indications including the corrected value of the coordinate indication $x_0'$ as the final values of the coordinate indications, if the determined area is the second area,
correcting the value of a coordinate indication $y_0'$ among the determined values of the coordinate indications by a second equation and determining the values of the coordinate indications including the corrected value of the coordinate indication $y_0'$ as the final values of the coordinate indications, if the determined area is the third area, and
correcting the values of the coordinate indications $x_0'$ and $y_0'$ among the determined values of the coordinate indications by the first and second equations and determining the values of the coordinate indications including the corrected values of the coordinate indications $x_0'$ and $y_0'$ as the final values of the coordinate indications, if the determined area is the fourth area.

13. The method of claim 12, wherein the first equation is $x_0 = (x_0' - 1) \bmod 7$ and the second equation is $y_0 = (y_0' - 1) \bmod 7$.

14. The method of claim 13, wherein the predetermined coordinates calculation rule is defined as the following equations, $$X = 7^3 \times x_3 + 7^2 \times x_2 + 7x_1 + x_0$$

$$Y = 7^3 \times = y_3 + 7rdy_2 + 4y_1 + y_0.$$

15. An apparatus to detect coordinates of a position on a display based on a pixel groups arranged on the display, the apparatus comprising:
a camera unit configured to capture an image of a pixel group of the display corresponding to a specific position, when an electronic pen is placed at the specific position on the display;
a recognizer configured to:
detect a reference point in one pixel included in the pixel group; and
determine a position area of the pixel group according to the reference point; and
a coordinate indication decider configured to determine values of coordinate indications corresponding to a plurality of pixels included in the pixel group in the area; and
a coordinates decider configured to apply a predetermined coordinates calculation rule to the values of the coordinate indications and determine final coordinates of the electronic pen,
wherein the coordinate indications have predetermined patterns defined as predetermined values, and each coordinate indication is located at one of the positions defined in a sub-pixel of each of the pixels of the pixel group except for the one pixel from which the reference point is detected.

16. The apparatus of claim 15,
wherein the recognizer determines the predetermined values corresponding to the predetermined patterns of the coordinate indications as the values of the coordinate indications and determines values of coordinate indications corresponding to the plurality of pixels included in the pixel group.

17. The apparatus of claim 16, wherein coordinate indications $x_0$ and $y_0$ are allocated to sub-pixels of a pixel corresponding to the reference point, coordinate indications $x_3$, $x_2$ and $x_1$ are allocated to sub-pixels of a pixel without the reference point that are located at the same X coordinate as the reference point, coordinate indications $y_3$, $y_2$ and $y_1$ are allocated to sub-pixels of a pixel without the reference point that are located at the same Y coordinate as the reference point, and parity indications are allocated to sub-pixels of a pixel located in a diagonal direction from the pixel corresponding to the reference point in the pixel group having the reference point.

18. The apparatus of claim 17, wherein the area is one of a first area representing the pixel group having the reference point, a second area shifted from the first area by one pixel along an X-axis, a third area shifted from the first area by one pixel along a Y-axis, and a fourth area shifted from the first area by one pixel along the X-axis and by one pixel along the Y-axis.

19. The apparatus of claim 18, wherein the coordinate indication decider determines the determined values of the coordinate indications as final values of the coordinate indications, if the determined area is the first area, corrects the value of a coordinate indication $x_0'$ among the determined values of the coordinate indications by a first equation and determines the values of the coordinate indications including the corrected value of the coordinate indication $x_0'$ as the final values of the coordinate indications, if the determined area is the second area, corrects the value of a coordinate indication $y_0'$ among the determined values of the coordinate indications by a second equation and determines the values of the coordinate indications including the corrected value of the coordinate indication $y_0'$ as the final values of the coordinate indications, if the determined area is the third area, and corrects the values of the coordinate indications $x_0'$ and $y_0'$ among the determined values of the coordinate indications by the first and second equations and determines the values of the coordinate indications including the corrected values of the coordinate indications $x_0'$ and $y_0'$ as the final values of the coordinate indications, if the determined area is the fourth area.

20. The apparatus of claim 19, wherein the first equation is $x_0 = (x_0' - 1) \bmod 7$ and the second equation is $y_0 = (y_0' - 1) \bmod 7$.

21. The apparatus of claim 20, wherein the predetermined coordinates calculation rule is defined as the following equations, $$X = 7^3 \times x_3 + 7^2 \times x_2 + 7ox_1 + x_0$$

$$Y = 7^3 \times = \times y_3 + 7 \times 7 \times y_2 + 4 \times y_1 + y_0.$$

22. The apparatus of claim 15, wherein the apparatus is included in the electronic pen.

23. An apparatus to detect coordinates of a position on a display based on a plurality of pixel groups arranged on the display, the apparatus comprising:
a recognizer configured to;
    detect a reference point in one pixel included in a pixel group corresponding to a specific position, the reference point being detected by processing an image of the pixel group of the display captured through a camera provided in the electronic pen, when the electronic pen is placed at the specific position on the display, and
    determine a position area of the pixel group according to the reference point;
a coordinate indication decider configured to determine values of coordinate indications corresponding to a plurality of pixels included in the pixel group in the area; and
a coordinates decider configured to apply a predetermined coordinates calculation rule to the values of the coordinate indications to determine final coordinates of the electronic pen,
wherein the coordinate indications have predetermined patterns defined as predetermined values, and each coordinate indication is located at one of the positions defined in a sub-pixel of each of the pixels of the pixel group except for the one pixel from which the reference point is detected.

24. The apparatus of claim 23,
wherein the recognizer determines the predetermined values corresponding to the predetermined patterns of the coordinate indications as the values of the coordinate indications and determines values of coordinate indications corresponding to the plurality of pixels included in the pixel group.

25. The apparatus of claim 24, wherein coordinate indications $x_0$ and $y_0$ are allocated to sub-pixels of a pixel corresponding to the reference point, coordinate indications $x_3$, $x_2$ and $x_1$ are allocated to sub-pixels of a pixel without the reference point that are located at the same X coordinate as the reference point, coordinate indications $y_3$, $y_2$ and $y_1$ are allocated to sub-pixels of a pixel without the reference point that are located at the same Y coordinate as the reference point, and parity indications are allocated to sub-pixels of a pixel located in a diagonal direction from the pixel corresponding to the reference point in the pixel group having the reference point.

26. The method of claim 25, wherein the area is one of a first area representing the pixel group having the reference point, a second area shifted from the first area by one pixel along an X-axis, a third area shifted from the first area by one pixel along a Y-axis, and a fourth area shifted from the first area by one pixel along the X-axis and by one pixel along the Y-axis.

27. The apparatus of claim 26, wherein the coordinate indication decider determines the determined values of the coordinate indications as final values of the coordinate indications, if the determined area is the first area, corrects the value of a coordinate indication $x_0'$ among the determined values of the coordinate indications by a first equation and determines the values of the coordinate indications including the corrected value of the coordinate indication $x_0'$ as the final values of the coordinate indications, if the determined area is the second area, corrects the value of a coordinate indication $y_0'$ among the determined values of the coordinate indications by a second equation and determines the values of the coordinate indications including the corrected value of the coordinate indication $y_0'$ as the final values of the coordinate indications, if the determined area is the third area, and corrects the values of the coordinate indications $x_0'$ and $y_0'$ among the determined values of the coordinate indications by the first and second equations and determines the values of the coordinate indications including the corrected values of the coordinate indications $x_0'$ and $y_0'$ as the final values of the coordinate indications, if the determined area is the fourth area.

28. The apparatus of claim 27, wherein the first equation is $x_0 = (x_0' - 1) \bmod 7$ and the second equation is $y_0 = (y_0' - 1) \bmod 7$.

29. The apparatus of claim 28, wherein the predetermined coordinates calculation rule is defined as the following equations, $$X = 7^3 \times x_3 + 7^2 \times x_2 + 7ox_1 + x_0$$

$$Y = 7^3 \times = oy_3 + 7ordy_2 + 4oy_1 + y_0.$$

30. The apparatus of claim 23, wherein the apparatus is included in an electronic blackboard.

31. A display panel to display content received from an electronic pen, on which pixel groups are arranged,
wherein each pixel group is a minimum recognition unit of the electronic pen and includes first to fourth pixels,
wherein a pattern representing a reference point is formed on a first sub-pixel among sub-pixels of the first pixel,
wherein patterns representing coordinate indications $x_0$ and $y_0$ are formed on the other sub-pixels of the first pixel,
wherein patterns representing coordinate indications $x_3$, $x_2$ and $x_1$ are formed on sub-pixels of the second pixel located at the same Y coordinate as the first pixel,
wherein patterns representing coordinate indications $y_3$, $y_2$ and $y_1$ are formed on sub-pixels of the third pixel that are located at the same X coordinate as the reference point, and
wherein patterns representing parity indications are formed on sub-pixels of the fourth pixel that are located in a diagonal direction from the first pixel.

32. A method of fabricating a display panel to display content received from an electronic pen, the method comprising:

- arranging pixel groups, each pixel group being a minimum recognition unit of the electronic pen and including first to fourth pixels;
- forming a pattern representing a reference point on a first sub-pixel among sub-pixels of the first pixel;
- forming patterns representing coordinate indications $x_0$ and $y_0$ on the other sub-pixels of the first pixel;
- forming patterns representing coordinate indications $x_3$, $x_2$ and $x_1$ on sub-pixels of the second pixel located at the same Y coordinate as the first pixel;
- forming patterns representing coordinate indications $y_3$, $y_2$ and $y_1$ on sub-pixels of the third pixel located at the same X coordinate as the reference point; and
- forming patterns representing parity indications on sub-pixels of the fourth pixel located in a diagonal direction from the first pixel.

* * * * *